(No Model.)

A. L. ROBBINS.
FRICTIONAL ELECTRICAL MACHINE.

No. 336,947. Patented Mar. 2, 1886.

Witnesses.
W. Rossiter
J. L. Lively

Inventor.
Alfred Lewis Robbins
By Ira J. Geer
Atty.

UNITED STATES PATENT OFFICE.

ALFRED LEWIS ROBBINS, OF CHICAGO, ILLINOIS.

FRICTIONAL ELECTRICAL MACHINE.

SPECIFICATION forming part of Letters Patent No. 336,947, dated March 2, 1886.

Application filed March 23, 1885. Serial No. 159,844. (No model.)

*To all whom it may concern:*

Be it known that I, ALFRED LEWIS ROBBINS, a citizen of the United States, residing at Chicago, in the county of Cook and State of Illinois, have invented a new and useful Improvement in Frictional Electrical Machines, of which the following is a specification.

My invention relates to improvements in frictional electrical machines in which Leyden jars having electrical connections are used, the whole being in combination with those parts of the machine where the electricity is generated.

In this specification I shall, to avoid confusion, term the electric current passing between the tops and interiors of Leyden jars the "direct" current, and the current passing between the bottoms and exteriors of Leyden jars the "induced" current.

The objects of my invention are, first, to provide a device by means of which from frictional electrical machines a double series of results can be obtained; second, to furnish a suitable mechanism for breaking, transmitting, and regulating the flow of the electric current passing between the exteriors of Leyden jars; third, to afford facilities for constantly varying and minutely diversifying this induced current; fourth, to provide a device affording electrical connections between the exteriors of Leyden jars and furnished with convenient electrodes, by means of which, in combination with the ordinary electrodes having electrical connections with the tops or exteriors of the same jars, simultaneous electric sparks of equal or varying intensity can be obtained, and their relative intensity compared and exhibited; fifth, to supply frictional electrical machines and that class of machines known as the "Töpler Holz Electric Machine," with an improvement by the use of which like and similar results can be obtained to those obtained from large induction-coils.

Figure 1:
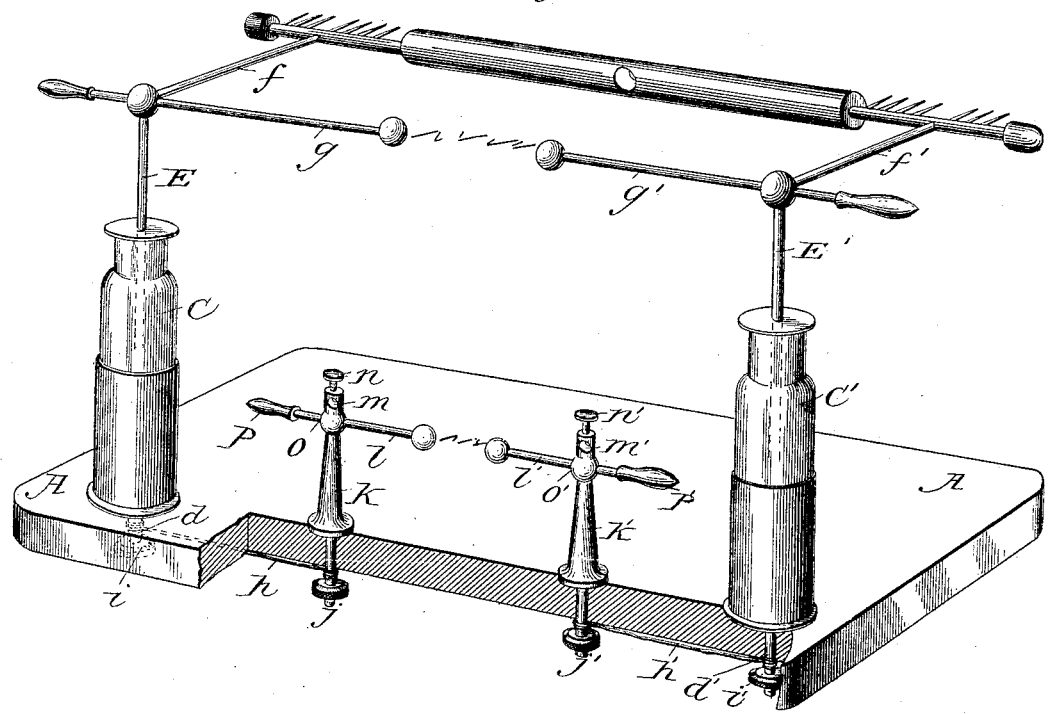
Figure 2:
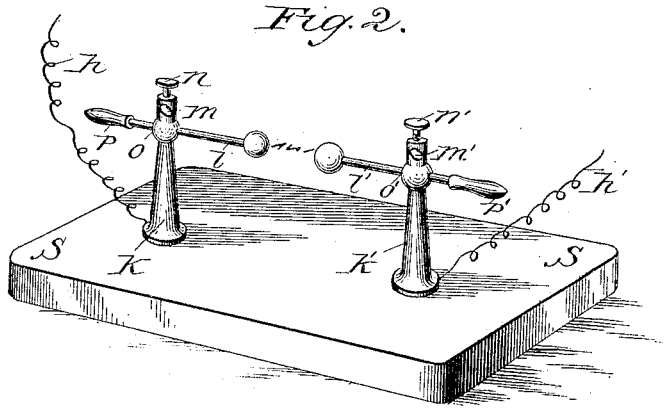

I attain my objects by means of the devices illustrated in the accompanying drawings, of which Figure 1 represents my improvements in immediate combination with Leyden jars, constituting part of an electric machine. Fig. 2 represents my improvements mounted on a separate bed.

Similar letters refer to similar parts in the figures.

Referring to letters in the drawings, A A forms the bed of the machine, mounted on any suitable legs or supports, and upon which are placed the various parts of the machine.

C C' are two Leyden jars, fastened to the bed by the bolts or pins $d\ d'$. These bolts or pins are in electrical connection with the exterior coatings of the Leyden jars. The tops or interiors of the jars are connected by the rods $e\ f$ and $e'\ f'$ with those parts of the machine which in ordinary electric machines support the combs or brushes, which, together with circular glass plates, act in generating the electricity.

$g\ g'$ are ordinary electrodes, provided with insulating-handles, sliding freely through the orifices made in the upper enlarged extremities of the electric connecting-rods $e\ e'$.

The portions of the machine for generating electricity and the usual devices for operating the same are not shown in the drawings, as unnessary to an understanding of my improvements.

A small piece of the front of the bed A A is represented as cut out in the drawings for the purpose of showing the electrical connections between the jars and standards $k\ k'$.

At the lower extremities of the bolts or pins $d\ d'$, fastening the Leyden jars to the bed, are press-nuts or thumb-screws $i\ i'$, so arranged with thread and screw as to furnish a means of attaching one end of the wires or rods $h\ h'$. These wires or rods are attached in the same manner at their other extremities by the press-nuts or thumb-screws $j\ j'$ to the bottom of the standards $k\ k'$, and are electrical conductors. The standards $k\ k'$, constructed substantially as shown, pass through the bed, and are provided at the top with thumb-screws $n\ n'$, having stems projecting into the apertures $m\ m'$, where can be secured the ends of wires, rods, or any electric conductor, as desired. These standards, forming electrical connections with the wires or rods $h\ h'$, are also provided with the circular orifices $o\ o'$, through which freely slide the electrodes $l\ l'$. These electrodes are provided with insulated handles $p\ p'$, and made of such length respectively that they may be brought close together or placed any distance apart, at the will of the operator, according to the generating power of the machine.

In operation the generated electricity is conveyed over the rods $f\,f'$ and $e\,e'$ to the Leyden jars, where it is stored. From these jars it may be discharged at will. By bringing the electrodes to the requisite distances simultaneous sparks are produced. By varying the distances between the respective couplets of electrodes sparks of diverse intensity are shown. The induced current can be used alone by a proper combination of the positions of the electrodes. By attaching to the standards $k\,k'$ by means of the thumb-screws $n\,n'$ wires or any electrical conductors the electricity may be conveyed to any point for purposes as desired, and its flow regulated by the electrodes $l\,l'$.

As to advantages gained by my invention, I contend that while adding nothing to the difficulty of operating, it gives to an electric machine a wider range of operation, and renders it capable of producing a higher grade of effects. It suits the machine to more varied uses for purposes of physical demonstration, illustration, and experiment. Equal direct results can be obtained to those given in the ordinary electric machine from the direct current; but, in addition thereto, I obtain by my improvements similar results from the induced current, thus adapting a machine to produce more elaborate, complex, and minute changes and effects than can be produced from any frictional electrical machine now in use to my knowledge. A means is likewise afforded, by employing the two systems of electrodes in combination, of securing a double series of electrical effects. Simultaneous sparks are produced, and their relative intensity can be exhibited and tested. These results, to my knowledge, are not obtained from any machine now used.

The contrivance for breaking, transmitting, and regulating the induced current is simple and effective, not only for these results, but it also enables the operator, since the electrodes may be placed close or remote, to produce from the induced current sparks of any length or intensity up to the generating maximum of the machine.

I utilize the induced current in using it for purposes of physiological treatment. This current is regulated and modified with great ease by my improvements.

The fact that I produce like and similar results from static electric machines as are obtained from large induction-coils is not the only advantage in this direction; but these results are reached more economically.

Used for experiment in passing the induced current through vacuum and gas tubes, the brilliant effect, by adopting my improvements, is multiplied many times.

I am aware that it has been heretofore proposed to electrically connect the outer coatings of Leyden jars used in connection with frictional electrical machines, and to insert electrical makes and breaks in the circuit so constituted. I do not claim such a construction, broadly; but

What I claim as my invention, and desire to secure by Letters Patent, is—

In an apparatus for experimenting with and demonstrating the properties of primary and induced electrical currents, the combination of a frictional electrical machine, a bed-plate, A, therefor, main conductors $f\,f'$, connected, respectively, with the positive and negative brushes of the machine, rods $g\,g'$, mounted to slide forward and back in said main conductors, whereby their extremities may be moved into and out of proximity with each other, so as to increase or diminish the length of the spark produced by the primary current at will, Leyden jars $c\,c'$, standards $k\,k'$, also erected upon bed-plate A, electrical connections $h\,h'$ between the standards $k\,k'$ and the outer coatings of the Leyden jars $c\,c'$, respectively, and rods $l\,l'$, mounted to slide back and forth in the standards $k\,k'$, whereby their extremities may be thrown into or out of proximity, in order to increase or diminish the length of the spark given off by the induced current, substantially as described and shown.

ALFRED LEWIS ROBBINS.

Witnesses:
J. R. CUSTER,
IRA J. GEER.